United States Patent [19]

Miller

[11] 4,388,331

[45] Jun. 14, 1983

[54] COLLAGEN SAUSAGE CASING

[75] Inventor: Albert T. Miller, Bridgewater, N.J.

[73] Assignee: Devro, Inc., Somerville, N.J.

[21] Appl. No.: 228,005

[22] Filed: Jan. 23, 1981

[51] Int. Cl.$^3$ .................... A23J 3/00; C12N 11/02
[52] U.S. Cl. ........................................ 426/63; 426/32;
    426/57; 426/105; 435/177
[58] Field of Search ................. 426/63, 32, 57, 92,
    426/105, 140, 573, 59, 652; 435/273, 177, 219,
    220, 213, 223

[56] References Cited

U.S. PATENT DOCUMENTS

| | | | |
|---|---|---|---|
| 2,365,728 | 12/1944 | Redemske | 426/57 |
| 3,037,870 | 6/1962 | Schleich et al. | 426/63 |
| 3,529,530 | 9/1970 | Tsuzuki | 426/32 |
| 3,664,844 | 5/1972 | Miller | 426/32 |
| 3,681,093 | 8/1972 | Tsuzuki et al. | 426/32 |

*Primary Examiner*—Raymond N. Jones
*Assistant Examiner*—Elizabeth J. Curtin
*Attorney, Agent, or Firm*—Michael Q. Tatlow

[57] ABSTRACT

There is disclosed an improved collagen sausage casing and a method to produce such a casing. The normal processes for manufacturing collagen casing are employed. Immediately prior to the point in the process where the collagen extrusion mass is extruded, a proteolytic enzyme is injected into the collagen gel stream. The proteolytic enzyme is immobilized and becomes non-functioning as the free water required for its activity is restricted by the further steps of the process. Upon stuffing the casing with a meat emulsion and subjecting the stuffed casing to the smokehouse or cookhouse cycles in the normal sausage manufacturing process or by cooking in the home, the enzyme is again reactivated and continues to breakdown the collagen thereby tenderizing the casing. The proteolytic enzyme may be papain, bromelain, ficin, fungal protease, bacterial protease, trypsin, chymotrypsin, pepsin and protease.

4 Claims, 1 Drawing Figure

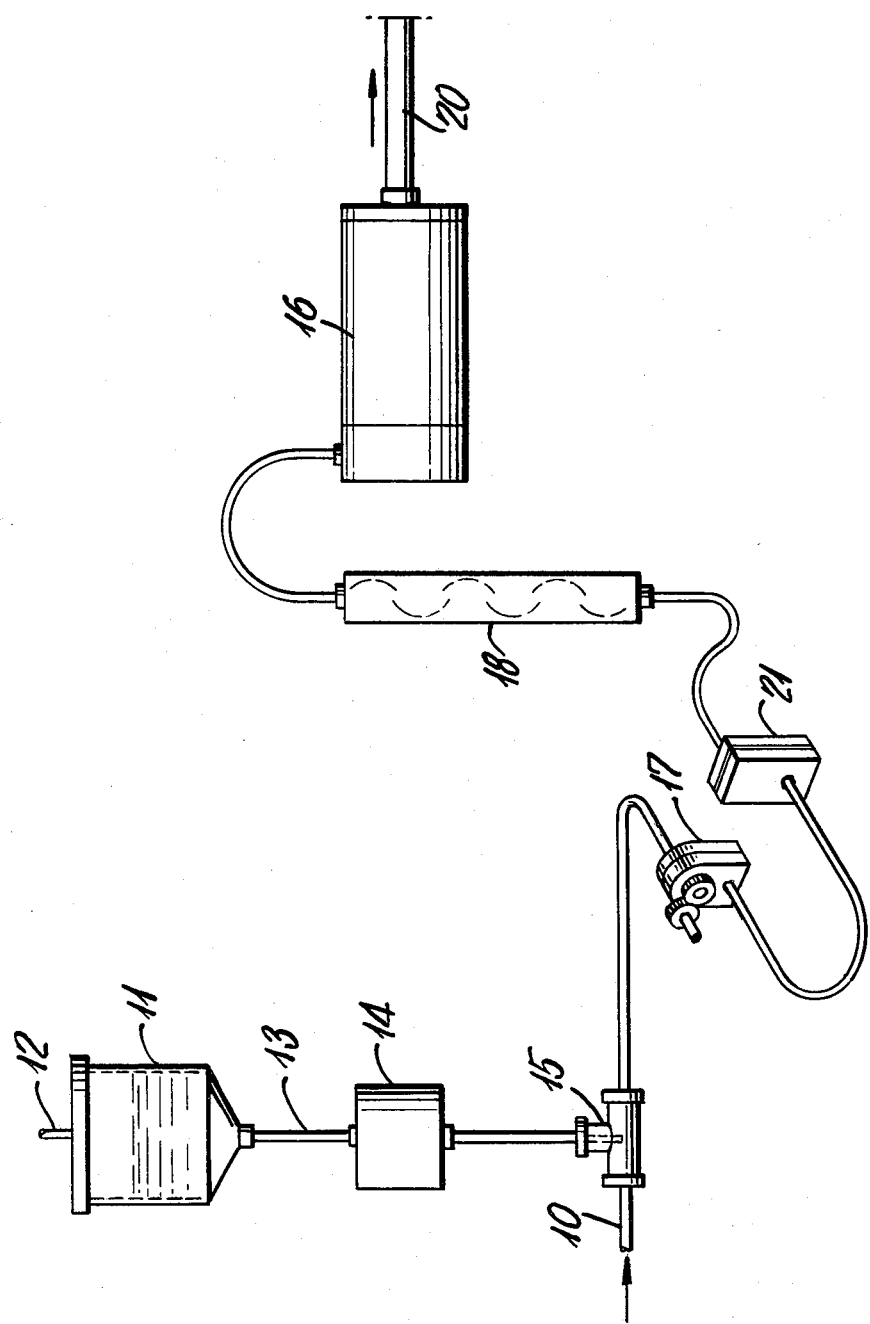

COLLAGEN SAUSAGE CASING

BACKGROUND OF THE INVENTION

This invention relates to an improved collagen sausage casing and to a process to manufacture the casing. The ideal collagen sausage casing must be of sufficient strength to be processed, to stuff or fill the casing with a meat emulsion to make the sausage and yet be tender when eaten. These characteristics are opposites, and efforts to increase the processing strength or machinability of the casing invariably result in diminishing the tenderness or eating quality of the casing. Conversely, attempts to improve the tenderness or eating quality of the casing have resulted in casings which have insufficient strength to withstand the stresses encountered during the stuffing, linking or other handling and machining of the casing.

Enzymes have been employed to treat natural animal intestine casings in an attempt to obtain a balance of the desired properties. The natural casings were immersed in an enzyme solution either before or after stuffing with the meat emulsion. These processes, disclosed in U.S. Pat. Nos. 2,314,313 and 2,321,621, treat only the exterior surfaces of the casings, and the interior portion of the casing is usually not effectively treated.

Proteolytic enzymes have also been used in prior art processes to treat the source of collagen employed in making the gels which are extruded to form collagen casings. These processes treated the animal hides or collagen dispersions with various enzymes to alter the characteristics of the collagen dispersion prior to extrusion. The enzymes were usually denatured or destroyed by various treatments prior to the extrusion of the collagen to form the casing, or after the casing was formed but prior to drying and finishing. Examples of such processes are disclosed in U.S. Pat. Nos. 2,920,000; 3,034,852; 3,071,477; 3,314,861; 3,373,046 and 3,681,093. For example, in U.S. Pat. No. 3,373,046, hides which had been treated with lime are treated with enzymes to assist in the removal of calcium from the limed hides. The enzyme is destroyed or denatured before the acid is added to form an extrudable, acid-swollen mass. In U.S. Pat. No. 3,314,861 insoluble collagen of steer hide is treated with various enzymes to completely solubilize the collagen into a solution from which a casing may be prepared. In U.S. Pat. No. 3,681,093, collagen is treated with an enzyme and acid to partially solubilize the collagen, i.e., to the extent of 10–20 percent. A casing is formed by extruding a fluid mass of acid swollen, partially solubilized collagen.

In these prior art processes; the enzymes are employed to either break down the non-collagen protein in the hide or to break down the collagen itself. In order to perform this function, the enzyme is incubated with the pieces of hide or other sources of collagen for periods of time ranging from 5 to 48 hours. The enzyme is added to the source of collagen prior to the usual acid swelling step.

Enzymes have also been used to treat collagen which is used to form films. The films did not have the wet tensile strengths that are required of a collagen casing material. Examples of such processes are disclosed in U.S. Pat. Nos. 3,529,530 and 3,664,844.

SUMMARY OF THE INVENTION

The present invention provides a collagen sausage casing for use in making smoked or cooked sausage that has excellent handling and machinability characteristics and yet is tender when eaten. The casing of the present invention contains an immobilized proteolytic enzyme uniformly distributed throughout the casing, which enzyme will be activated during the smokehouse or cookhouse cycles in the conventional sausage manufacturing process and will tenderize the casing. Casing tenderization can also be effected in consumer cooking of the encased sausage. Heat processing and smokehouse processing are meant to define the commercial processing steps carried out by the meat processor. Consumer cooking is defined as the heating step carried out by the one consuming the sausage or the one preparing the sausage for consumption. In the present process, the enzyme is added to the gel from which the casing is prepared immediately before extrusion. The enzyme becomes immobilized as the extrusion mass is formed and coagulated. During the subsequent processing of the casing the enzyme becomes non-functioning as the free water required for its activity is severely restricted. When used in the present specification and claims, the term "immobilize" means that the enzyme is physically or mechanically held in the collagen of the casing and will not migrate out of the casing. The term "non-functioning" means that the enzyme is inactivated but not destroyed and may be reactivated by placing the casing into the proper environment for the enzyme to function. The proteolytic enzymes that may be used in the present invention include papain, bromelain, ficin, fungal protease, bacterial protease, trypsin, chymotrypsin, pepsin and PROCTASE, an enzyme produced from *Aspergillus Niger* var. *macroporous* available from Meiji Seika Kaisha Ltd. of Japan. Since the casing of the present invention is edible, the enzyme must be one that is approved by an appropriate governmental authority for food use.

BRIEF DESCRIPTION OF THE DRAWINGS

FIG. 1 is a flow diagram illustrating the present process.

DETAILS OF THE INVENTION

The present invention can be employed with collagen gels prepared by known processes. For example, U.S. Pat. No. 3,123,653 teaches the preparation of thin-walled collagen casing from a source of collagen derived from animal hides. A collagen gel is prepared at a solids content from 2.5 to 6% collagen. The mass is extruded in the form of a tubular body into a solution of ammonium sulfate which coagulates and hardens the tubular body. The tubular body is then washed, tanned, plasticized and dried. U.S. Pat. No. 3,535,125 discloses a process in which the tubular body is coagulated by the use of gaseous ammonia.

In the above-mentioned process, the collagen gel is prepared from fresh (frozen or salted) dehaired, limed or unlimed hides. The hides are washed, defleshed, and the hair and epidermis are removed. The corium of the hide is then cut into small sections and reduced to a pulp by grinding. The finely ground corium is swollen with an acid and may be blended with various additives such as cellulose fibers or a plasticizer. The blending is usually further improved with a homogenizer. The resulting collagen mass or gel is then extruded into a tubular shape, coagulated, washed, tanned, plasticized and dried. The finished products can be wound on reels or shirred into standard lengths.

The present process may also be employed in the manufacture of collagen casings from gels containing 6 to 12% collagen solids. In a process employing a high collagen solids gel, the casing may be extruded directly into the ambient atmosphere, dried, and the acid in the casing neutralized in a later processing step. The later processing steps include repetitive contacting of the casing with various liquids which act as cross-linking, plasticizing or other processing agents with drying between the processing steps. A typical process employing a high collagen solids gel is disclosed in U.S. Pat. No. 2,246,236.

In the present process, the collagen gel is prepared in the manner set forth in the above-mentioned patents. Immediately prior to the extrusion of the gel to form the tubular casing, an aqueous dispersion of the enzyme is injected into the gel stream. The concentration of the enzyme in the dispersion will vary with the particular enzyme employed, but generally the concentration will be between 0.001 and 0.5 percent based on the weight of collagen solids and preferably between 0.01 and 0.15 percent on the same basis. The enzyme dispersion is delivered to the gel stream with a metering pump to accurately control the amount of enzyme added to the gel stream. The gel is then fed with a gel metering pump to the extruder. In order to insure intimate mixing of the enzyme with the gel, the gel-containing enzyme is fed through an in-line static mixer before being introduced to the extruder. It is important that the enzyme be introduced into the gel stream immediately prior to extrusion to limit the time that the active enzyme is exposed to the collagen in the gel. The active enzyme will begin to break down the collagen in the gel upon introduction into the gel. The enzyme becomes immobilized as the extrusion mass is extruded into a casing and coagulated. During the subsequent process steps performed in finishing the tubular casing, the enzyme becomes non-functioning since the free water that is available for enzymatic action is severely restricted. It is therefore necessary to limit the time that the active enzyme is in contact with the gel or extruded casing before the enzyme becomes non-functioning.

The enzymes may be rendered non-functioning by a variety of different mechanisms depending on the particular enzyme employed. For example, a shift in the pH will inactivate some of the enzymes. A reduction in the water content in the casing to below certain minimum levels will render all of the enzymes which are useful in the practice of the present invention non-functioning. The water activity of the casing is reduced when the casing is dried to a water content of between 10% and 20%, based on the total weight of the casing. Water activity is a measure of the water within the casing that is not bound into the collagen structure and is available to chemically react with an enzyme or other agents. The available water in the casing can also be reduced as the result of the presence in the casing of polyols such as glycerine or propylene glycol which are used as plasticizers in preparing collagen casings. These plasticizers effectively bind free water in the casing and render the water unavailable for enzymatic activity.

In order to prevent significant degradation of the collagen by the enzyme, the casing should be dried to reduce its water content and immobilize the enzyme as rapidly as possible. In the high solids extrusion processes, the reduction of the water level to a level low enough to render the enzyme non-functioning occurs within about 10 minutes of the time of extrusion. In the low solids extrusion processes, the drying step follows a washing and plasticizing step. In this process, drying of the casing to a water level where the enzyme is rendered non-functioning occurs within 25 to 30 minutes of the time of extrusion. During this time period, the enzyme is degrading the collagen, but the degree of degradation is not sufficient to cause a significant reduction in the tensile strength of the casing. The conditions present during standard casing rehumidification steps are also insufficient to cause excessive reduction of the tensile strength of the casing.

The enzyme contained in the casing is reactivated after the casing is stuffed with a meat emulsion by the sausage maker. In the normal manufacture of cooked or smoked sausage, after stuffing, the sausage is hung in a chamber and subjected to heat, steam and smoke to cure the sausage. It is the combination of the moisture contained in the meat emulsion, the steam and heat that reactivates the enzyme causing the controlled degradation of collagen which results in the tenderization of the casing. In carrying out the smokehouse or cook-house cycles, the rise in temperature toward the end of the cycle can be used to destroy or denature the enzyme, thereby limiting the extent of degradation and tenderization of the casing.

The apparatus employed to introduce the enzyme into the collagen gel is shown diagrammatically in FIG. 1. The gel is fed through line 10 from the filters described in Example I. A dispersion of the particular enzyme employed is contained in the tank 11. A source of air under pressure is connected to the tank 11 through air inlet 12. The air pressure provides a positive pressure to force the enzyme dispersion from the tank 11 through line 13 to a positive displacement metering pump 14. The enzyme dispersion is introduced in the gel feed line 10 through an injection port 15. The gel and enzyme are fed in a controlled amount to the extruder 16 by a gel metering pump 17. Between the gel metering pump 17 and the extruder 16 there is a filter 21 and an in-line static mixer 18 which uniformly mixes the enzyme through the gel. The gel is extruded into casing 20 which is then further processed and packaged in the usual manner.

DETAILED DESCRIPTION OF THE INVENTION

The following examples will illustrate certain preferred products and methods of carrying out the invention and will differentiate various properties of the edible collagens made with the process and product of the present invention from those which are made without the use of enzymes in the extrusion mass. In determining various properties, the following test procedures are referred to.

1. In-Process Breaking Strength. After each wet processing step, sections of wet casing are cut from the continuous tube and stressed in a simple strain gauge apparatus (Chatillon Dial Gauge Model DPP) until they break. The maximum load (in grams) at the breaking point is recorded, the average of 5 to 10 determinations being recorded as the "In-Process Breaking Strength" or simply wet breaking strength.

2. Hot Acid Breaking Strength. The test is designed to show the degree of increase in strength as a result of treatments which promote a cure or cross-linking effect. It consists of treating the casing for one minute in 0.1 N hydrochloric acid at 70° C. The casing is removed, mounted in a simple strain gauge apparatus (Chatillon Dial Gauge Model DPP) and pulled at a constant rate until breakage occurs. Results are reported as hot acid breaking strength in grams.

3. Mullen Burst Strength. This is defined as the air pressure in pounds per square inch required to burst a sample of collagen film which has been equilibrated in a 50% relative humidity atmosphere prior to testing. The values of burst strength are determined on a Perkins Mullen Tester (Model C) according to the procedure of ASTM-D-2529.

4. Tensile Strength. The tensile strength at break is determined in the machine direction of a film sample. The test is performed using an Instron Universal Tester according to the procedure of ASTM-D-882 64T method A. The initial grip separation is 5 inches, and the rate of grip separation is 0.5 inch per minute. The results are reported as kg./cm$^2$.

5. Casing Tenderness. A stainless steel, tooth-like probe with a major axis of one-half inch and a 25° taper is mounted on an Instron Universal Tester. Encased sausage links to be tested, either uncooked at refrigerator temperature or after reheating, are placed on a supporting frame and the machine operated at a controlled rate of 50 centimeters per minute. The force required to penetrate the sausage casing is recorded in both the machine direction and in the transverse direction. Results are reported as the average of a minimum of five tests per sample in each direction. The greater the penetration force, the less tender the casing. Generally, large diameter casings for cooked sausage applications are unacceptable in tenderness if the force of penetration exceeds 3.5 kgs. The effectiveness of the enzyme treatment can also be determined by the reduction in the tensile strength after the casing is subjected to a standard smokehouse processing cycle.

EXAMPLE I

Hide Preparation, Dehairing, and Unliming

Hides from freshly slaughtered animals are trimmed and sided. They are washed and soaked overnight in city water at 16° C. The following day they are fleshed and weighed.

To a paddle vat with a capacity of 1100 gallons is added 3300 kgs. of water and 1270 kgs. of the fleshed hide. Forty-four and one-half kgs. (3.0%) of hydrated lime and 32 kgs. (2.5%) of sodium sulfide are added to the vat and the paddle is alternately run and stopped over a 15-hour period. The paddle remains idle an additional 9 hours after which the vat is drained, and the hides are washed in city water (16° C.) for 15 minutes. The paddle vat is refilled with a 1.0% lime solution, rotated 5 minutes, then allowed to rest an additional hour. The washed hides are then split on a leather-splitting machine.

The corium layer is further processed to prepare the collagen for extrusion. A large wooden drum (capacity 3590 gallons) is charged with 2600 kgs. of hide corium, prepared as described above, and 1110 gallons of water. The hide is washed in the drum for 30 minutes at a flow rate of 150 liters per minute. The wash is drained from the hide corium, and the washed corium is treated in the drum with 1110 gallons of water containing 13 kgs. of ammonium sulfate for 2 hours, drained, and refilled with the ammonium sulfate solution. After paddling the hide an additional 2 hours, the vat is drained and hide corium is washed for 3 hours at a flow rate of 150 liters per minute. The water is again drained from the hide corium, and the washed corium is treated in the drum with 1110 gallons of water containing 18 kgs. of hydrous citric acid and 24.5 kgs. of sodium citrate dihydrate. The drum is rotated for 16 hours with hourly adjustment of solution pH to maintain a solution pH of 4.6. At the end of this 16-hour treatment period, the citrate solution is drained, and the hides are washed for 4 hours in running water at a flow rate of 150 liters per minute.

The hides, which have been dehaired with lime and then unlimed (delimed), are then shredded and ground to a particle size of approximately one-fourth inch.

The ground particles in an amount of 15.35 kgs., containing 4.05 kgs. of dry hide solids, are mixed with 29.65 kgs. of water, and the mixture is passed through a high-speed cutting mill where the hide particles are shredded to form a hydrated mass of fibrous character.

In a stainless steel tank, 0.85 kgs. of cellulose fibers are thoroughly dispersed with 43.58 kgs. water. To this cellulose dispersion is added 0.566 kgs. of 31.5% hydrochloric acid with complete mixing. The mass of fibrous hydrated collagen from the high-speed cutting mill and the acid-cellulose-water mixture are blended together to form a swollen collagen mass or gel. After storage for a period of 20 hours, the mixture of cellulose and acid-swollen collagen is further dispersed with a homogenizer fitted with a two-stage valve and operated with a 1500 psi drop per stage. The mixture is homogenized a second time at 2000 psi. The homogenized mixture is pumped to a storage tank and deaerated under vacuum and aged for a period of 24 hours at 20° C. The dispersion so obtained has the following composition:

|  | Percent |
| --- | --- |
| Hide Solids | 4.50 |
| Cellulose | 0.90 |
| Hydrochloric Acid | 0.198 |

Procedure for casing preparation is as follows:

The homogenized dispersion is pumped from the storage vessel through a wound wire filter and then to a metering pump at the rate of 296 gms./min. The mass is extruded through a disk extruder of the type illustrated in FIG. 1 of U.S. Pat. No. 3,122,788. The extruder is cooled by circulation of fluid through the jacket at 9° C. The extruded collagen casing, which is supported on a conveyor belt, is inflated with air to a diameter of 32 mm. and coagulated with anhydrous ammonia. The coagulated, neutralized casing is flattened between pinch rollers and falls from the end of the belt into the holding baskets within the water wash tank. The casing is transferred through a series of compartments within the tank by the godets and is subjected to intimate contact with the wash water which circulates through the openings in the walls of each compartment. The total dwell time of the casing in the water wash tank is 20 minutes. The wet strength of the casing after water washing is 1,023 grams.

The plasticizer composition within the plasticizer tank is an aqueous solution of 6.0% glycerin and 1.1% carboxymethylcellulose. The dwell time of the casing in the plasticizer tank is 10 minutes. The casing, which is a seamless tube of cohered collagen, after removal from the plasticizing bath is dried and humidified to a moisture content of 17–19%.

The properties and performance evaluation of this casing are summarized in Table I.

While this casing has sufficient strength for good machinability, its tenderness as judged by a trained taste panel was unacceptable. This was confirmed by Instron Puncture Test measurements.

EXAMPLE II

The homogenized dispersion of Example I is pumped from the storage vessel through a wire wound filter and then to a metering pump at a rate of 323 gm./min. At a point just prior to entering the metering pump, an aqueous dispersion containing 0.1% of proteolytic enzyme (papain) is delivered into the dispersion at a rate of 6.7 gm./min. (The dilute enzyme dispersion is fed from a pressurized supply tank through a constant delivery pump.) The extrusion mass consisting of the collagen-cellulose-acid dispersion and enzyme solution is pumped by metering pump through an in-line static mixer (Kenics Co., Danvers, Mass.) where an intimate mixing of the collagen and enzyme occurs. This extrusion mass, which now contains 0.046% papain enzyme based on collagen solids, is extruded and processed according to the procedure described in Example I.

Representative Smokehouse Process

The casing of Example II is stuffed with an all-beef frankfurter emulsion and ty-linked. The linked strands are hung on racks and placed in the smokehouse at a temperature of 60° C. for 15 minutes. Air circulation is provided at 200 cubic feet per minute. The temperature is raised to 63° C. and humidity increased to 60% RH. After 10 minutes, hardwood smoke is introduced, and the temperature and humidity are maintained at previous levels for an additional 15 minutes. Drying is accomplished at a dry bulb temperature of 74° C. for 15-20 minutes. A steam treatment is accomplished at 74° C. for 8-12 minutes followed by cooling of the links to 27° C. with a cold water spray. The product is removed to a cold room to chill overnight. The properties and performance of this casing are also summarized in Table I.

This casing has sufficient strength for good machinability and also was judged by a trained taste panel to be of acceptable tenderness after consumer cooking. This was confirmed by Instron Puncture Test measurements.

TABLE I
COMPARISON OF CASINGS PREPARED FROM GELS OF EXAMPLE I AND EXAMPLE II

|  | EXAMPLE I | EXAMPLE II |
|---|---|---|
| GEL VISCOSITY ($\times 10^3$ dynes/cm$^2$)[1] | 82.0 | 83.5 |
| EXT. PRESSURE | 100 psi | 103 psi |
| IN-PROCESS WET STRENGTHS AVERAGE | 1023 ± 87 g. | 1063 ± 72 g. |
| HOT ACID BREAKING STRENGTH | 985 ± 95 g. | 1065 ± 129 g. |
| MULLEN BURST STRENGTH (psi) | 26.8 ± 2.6 | 31.3 ± 4.9 |
| TENSILE STRENGTH MD (kg./cm$^2$) | 455 ± 44 | 502 ± 39 |
| STUFFING PERFORMANCE | SATISFACTORY | SATISFACTORY |
| LINKING PERFORMANCE | SATISFACTORY | SATISFACTORY |
| CASING TENDERNESS[2] | | |
| UNHEATED | 8.13 | 6.77 |
| REHEATED (BOIL, 10 MIN.) | 4.78 | 2.66 |

[1] SHEAR STRESS @ 6827 SEC.$^{-1}$
[2] INSTRON PUNCTURE FORCE IN KG. ON ENCASED SAUSAGES.

EXAMPLE III

Procedure of Example I followed except as noted below:

(a) Hide Preparation—same as Example I.

(b) Gel Preparation—In a stainless steel tank, 0.85 kgs. of cellulose fibers are thoroughly dispersed with 43.58 kgs. water. To this cellulose dispersion is added 0.004 kgs. active papain and 0.566 kgs. of 31.5% hydrochloric acid with complete mixing. The mass of fibrous hydrated collagen from the high-speed cutting mill and the acid-cellulose-papain-water mixture are blended together to form a swollen collagen mass or gel. After storage for a period of 20 hours at 20° C., the swollen mass is further dispersed with a homogenizer fitted with a two-stage valve and operated with a 1500 psi. drop per stage. After storage for an additional 24 hours at 20° C., the mixture is pumped to a storage tank and deaerated under vacuum. The dispersion so obtained has the following composition:

|  | Percent |
|---|---|
| Hide Solids | 4.500 |
| Cellulose | 0.900 |
| Hydrochloric Acid | 0.198 |
| Papain | 0.044 |

(c) Procedure for casing preparation is identical to that described in Example I.

The properties and performance evaluation of this casing are summarized in Table II. This example shows the preparation of a casing according to the prior art process. While this casing was judged to be acceptable in tenderness after consumer cooking, its tensile strength was low and it would not perform satisfactorily in machining.

TABLE II

| Gel Viscosity ($\times 10^3$ dynes/cm$^2$)[1] | 40.7 |
|---|---|
| Extruder Pressure (psi.) | 73 |
| In-Process Wet Strength (g.) | 824 ± 38 |
| Tensile Strength (kg./cm$^2$) | 324 |
| Stuffing & Linking Performance | Unsatisfactory (high breakage) |
| Casing Tenderness | Casing failure during heat processing due to excessive weakness, gelatinization. |

[1] Shear Stress @ 6827 sec.$^{-1}$

TABLE III

Table III compares the properties of the casings made according to the Examples.

| PROCESS | EXAMPLE I CONVENTIONAL PROCESS | EXAMPLE II ENZYME INJECTED INTO GEL IMMEDIATELY PRIOR TO EXTRUSION | EXAMPLE III PRIOR ART ENZYME TREATMENT GEL WITH INCUBATION TIME TO EFFECT DEGRADATION OF COLLAGEN |
| --- | --- | --- | --- |
| GEL VISCOSITY | NORMAL | NORMAL | LOW |
| COLLAGEN SOLUBILITY | LOW | LOW | HIGH |
| IN-PROCESS STRENGTH | SATISFACTORY | SATISFACTORY | LOW |
| FINISHED CASING TENSILE STRENGTH | SATISFACTORY | SATISFACTORY | LOW |
| MACHINABILITY | SATISFACTORY | SATISFACTORY | POOR |
| TENDERNESS | POOR | SATISFACTORY | SATISFACTORY |

EXAMPLE IV

The process of Example II is repeated except that an aqueous dispersion containing 0.1% of the proteolytic enzyme bromelain is used in place of papain. The casing had excellent strength for stuffing and linking. The encased sausage processed through the smokehouse satisfactorily and was found to have bite characteristics which were very acceptable as judged by an experienced taste panel. The casing tenderness value of cooked product of this example was 2.45 kg. The tensile strength of the casing prior to the stuffing with the meat emulsion was 516 kg/cm$^2$. After the casing was stuffed and heat processed in the smokehouse, the tensile strength of the casing was 341 kg/cm$^2$.

EXAMPLE V

The process of Example II is repeated except that the level of proteolytic enzyme injected into the extrusion mass exceeded that level recommended in the practice of the present invention. An aqueous solution of papain was added to the extrusion mass such that the final concentration was 2.5%. of collagen solids. The casing had excellent strength for stuffing and linking but became very weak during smokehouse processing and dropped off of the smokehouse tree before the cycle was complete. The casing was almost completely hydrolyzed and exhibited a mushy, gelatinized appearance.

EXAMPLE VI

A collagen extrusion mass was prepared as described in Example II. In place of the enzyme papain of Example II, each of four different proteolytic enzymes were added to separate collagen extrusion masses. A portion of the extrusion mass was also maintained without addition of enzyme. Each of these materials were separately extruded and processed into casing. All of the casings so prepared were stuffed with a meat emulsion, and the resulting sausages were subjected to the cookhouse cycle set forth in Example II. The casings were then stripped from the sausages and were tested for tensile strength. The reduction in tensile strength of casings containing active enzyme as compared to controls (no enzyme) demonstrated the effectiveness of these enzymes for use in the present invention.

TABLE IV

| Enzyme | Concentration | Tensile Strength of Casing Prepared Without Enzyme kg/cm$^2$ | Tensile Strength of Casing Prepared Containing Enzyme kg/cm$^2$ | % Difference in Tensile Strength |
| --- | --- | --- | --- | --- |
| Ficin | 0.05% | 555 | 263 | 53% |
| Trypsin | 0.01% | 555 | 406 | 27% |
| Fungal Protease | 0.1% | 586 | 399 | 32% |
| Proctase | 0.1% | 587 | 496 | 15% |

I claim:

1. A method of preparing an edible collagen film comprising:
    (a) preparing an extrudable collagen gel containing from 2% to 12% by weight of collagen;
    (b) adding to the collagen gel, in an amount of from 0.001 to 0.5 percent, based on the dry weight of the collagen in the gel, a proteolytic enzyme selected from the group consisting of papain, bromelain, ficin, fungal protease, bacterial protease, trypsin, chymotrypsin, and pepsin;
    (c) extruding the enzyme-containing collagen gel before sufficient time has elapsed to allow significant hydrolysis of the collagen to form a cohered collagen casing film, thereby immobilizing the proteolytic enzyme; and
    (d) reducing the water content of the casing to between 10% and 20%, based on the weight of the casing to reduce the water activity of the casing and render the enzyme non-functioning.

2. The method of claim 1 in which the enzyme is present in an amount of from 0.01 to 0.15 percent, based on the weight of collagen.

3. The method of claim 2 including the further steps of stuffing the casing with a meat emulsion and heating the stuffed casing containing the meat emulsion to cook the sausage and reactivate the proteolytic enzyme to render the casing tender.

4. The process of claim 1 in which the enzyme is ficin.

* * * * *